United States Patent
Mandel et al.

(10) Patent No.: US 12,475,582 B2
(45) Date of Patent: Nov. 18, 2025

(54) SYSTEM AND METHOD FOR OCCLUSION RECONSTRUCTION IN SURROUND VIEWS USING TEMPORAL INFORMATION

(71) Applicant: GM GLOBAL TECHNOLOGY OPERATIONS LLC, Detroit, MI (US)

(72) Inventors: Yehonatan Mandel, Herzliya (IL); Michael Slutsky, Kefar-Saba (IL)

(73) Assignee: GM Global Technology Operations LLC, Detroit, MI (US)

( * ) Notice: Subject to any disclaimer, the term of this patent is extended or adjusted under 35 U.S.C. 154(b) by 578 days.

(21) Appl. No.: 17/835,310

(22) Filed: Jun. 8, 2022

(65) Prior Publication Data

US 2023/0401728 A1    Dec. 14, 2023

(51) Int. Cl.
*G06T 7/521* (2017.01)
*G01S 17/89* (2020.01)
(Continued)

(52) U.S. Cl.
CPC ............... *G06T 7/521* (2017.01); *G01S 17/89* (2013.01); *G06T 7/11* (2017.01); *G06V 20/58* (2022.01)

(58) Field of Classification Search
CPC ......... B60W 60/001; B60W 2420/403; B60W 2556/10; B60W 30/095; G06V 20/58;
(Continued)

(56) References Cited

U.S. PATENT DOCUMENTS

2013/0294710 A1* 11/2013 Chou .................. G06T 7/593
   382/293
2014/0347469 A1* 11/2014 Zhang .................. H04N 7/183
   348/118
(Continued)

FOREIGN PATENT DOCUMENTS

WO    WO-2018101746 A2 *  6/2018    ............... G06T 7/00

OTHER PUBLICATIONS

English translation of WO 2018101746 A2 (Year: 2018).*
(Continued)

*Primary Examiner* — Sumati Lefkowitz
*Assistant Examiner* — Aaron Joseph Sorrin
(74) *Attorney, Agent, or Firm* — Quinn IP Law

(57) ABSTRACT

A system for occlusion reconstruction in surround views using temporal information is provided. The system includes an active camera device generating image data describing a first view of an operating environment and a computerized visual data controller. The controller includes programming to analyze the image data to generate a three-dimensional computerized representation of the operating environment, utilize the image data and the representation of the operating environment to synthesize a virtual camera view of the operating environment from a desired viewpoint, and identify an occlusion in the virtual camera view. The controller further includes programming to utilize historical iterations of the image data identify immobile objects within the operating environment and utilize the historical iterations to
(Continued)

estimate filled information for the occlusion. The controller further includes programming to reconstruct the occlusion with the filled information using pixel data from the immobile objects and utilize the representation to provide navigational guidance.

20 Claims, 6 Drawing Sheets

(51) Int. Cl.
  *G06T 7/11* (2017.01)
  *G06V 20/58* (2022.01)
(58) Field of Classification Search
  CPC .................. G06V 20/588; G06V 10/26; G06T 2207/10028; G06T 2207/30261; G06T 15/00; G06T 19/003; G06T 2207/30236; G06T 17/00; G06T 7/521; G06T 7/11; G06T 5/50; G06T 5/77; G01C 21/20; G01C 21/00; G01C 21/1656; G01C 21/3658; G08G 1/167; G08G 1/0968; G01S 17/89; G01S 13/867; G01S 13/89; G01S 7/4039; G01S 2013/9323; G01S 13/931; G01S 17/86; G01S 17/931

See application file for complete search history.

(56) References Cited

U.S. PATENT DOCUMENTS

| | | | |
|---|---|---|---|
| 2018/0246515 A1* | 8/2018 | Iwama | G05D 1/0251 |
| 2019/0355171 A1* | 11/2019 | Ashley | G06T 15/04 |
| 2020/0357128 A1* | 11/2020 | Mccombe | G06T 7/73 |

OTHER PUBLICATIONS

Michael Slutsky and Albert Shalumov, "Using Epipolar Reprojection for Virtual View Perspective Change", U.S. Appl. No. 17/189,877, filed Mar. 2, 2021.

* cited by examiner

SYSTEM AND METHOD FOR OCCLUSION RECONSTRUCTION IN SURROUND VIEWS USING TEMPORAL INFORMATION

INTRODUCTION

The disclosure generally relates to a system and method for occlusion reconstruction in surround views using temporal information.

Autonomous navigation systems, semi-autonomous navigation systems, and driver-assist/driver-warning systems interpret sensor data and make determinations regarding whether a path is clear for navigation and whether any objects may obstruct the clear path in an operating environment.

SUMMARY

A system for occlusion reconstruction in surround views using temporal information is provided. The system includes an active camera device generating image data describing a first view of an operating environment and a computerized visual data controller. The computerized visual data controller includes programming to analyze the image data to generate a three-dimensional computerized representation of the operating environment, utilize the image data and the three-dimensional computerized representation of the operating environment to synthesize a virtual camera view of the operating environment from a desired viewpoint, and identify an occlusion in the virtual camera view. The computerized visual data controller further includes programming to utilize historical iterations of the image data and identify immobile objects within the operating environment and utilize the historical iterations of the image data to estimate filled information for the occlusion. The computerized visual data controller further includes programming to reconstruct the occlusion in the three-dimensional computerized representation with the filled information using pixel data from the immobile objects and utilize the three-dimensional computerized representation to provide navigational guidance within the operating environment.

In some embodiments, the programming to analyze the image data includes programming to perform depth interpretation and semantic segmentation upon the image data.

In some embodiments, the programming to identify the occlusion includes programming to identify a potentially mobile object in the operating environment and identify the occlusion in the virtual camera view caused by the mobile object.

In some embodiments, the system further includes a plurality of active camera devices generating the image data.

In some embodiments, the programming to utilize the image data and the three-dimensional computerized representation to synthesize the virtual camera view includes programming to utilize epipolar reprojection to synthesize the virtual camera view.

In some embodiments, the system further includes a sensor device selected from a light detection and ranging (LIDAR) device or a radar device. The computerized visual data controller further includes programming to utilize data from the sensor device to improve the three-dimensional computerized representation.

According to one alternative embodiment, a system for occlusion reconstruction in surround views using temporal information is provided. The system includes a device including an active camera device generating image data describing a first view of an operating environment and a computerized visual data controller. The computerized visual data controller includes programming to analyze the image data to generate a three-dimensional computerized representation of the operating environment, utilize the image data and the three-dimensional computerized representation of the operating environment to synthesize a virtual camera view of the operating environment from a desired viewpoint, and identify an occlusion in the virtual camera view. The computerized visual data controller further includes programming to utilize historical iterations of the image data identify and immobile objects within the operating environment and utilize the historical iterations of the image data to estimate filled information for the occlusion. The computerized visual data controller further includes programming to reconstruct the occlusion in the three-dimensional computerized representation with the filled information using pixel data from the immobile objects and utilize the three-dimensional computerized representation to provide navigational guidance within the operating environment.

In some embodiments, the device includes a vehicle.

In some embodiments, the programming to analyze the image data includes programming to perform depth interpretation and semantic segmentation upon the image data.

In some embodiments, the programming to identify the occlusion includes programming to identify a potentially mobile object in the operating environment and identify the occlusion in the virtual camera view caused by the potentially mobile object.

In some embodiments, the system further includes a plurality of active camera devices generating the image data.

In some embodiments, the programming to utilize the image data and the three-dimensional computerized representation to synthesize the virtual camera view includes programming to utilize epipolar reprojection to synthesize the virtual camera view.

In some embodiments, the system further includes a sensor device selected from a light detection and ranging (LIDAR) device or a radar device. The computerized visual data controller further includes programming to utilize data from the sensor device to improve the three-dimensional computerized representation.

According to one alternative embodiment, a method for occlusion reconstruction in surround views using temporal information is provided. The method includes operating an active camera device to collect image data describing a first view of an operating environment and, within a computerized processor, receiving the image data from the active camera device and analyzing the image data to generate a three-dimensional computerized representation of the operating environment. The method further includes, within the computerized processor, utilizing the image data and the three-dimensional computerized representation of the operating environment to synthesize a virtual camera view of the operating environment from a desired viewpoint, identifying an occlusion in the virtual camera view, and utilizing historical iterations of the image data and identify immobile objects within the operating environment. The method further includes, within the computerized processor, utilizing the historical iterations of the image data to estimate filled information for the occlusion, reconstructing the occlusion in the three-dimensional computerized representation with the filled information using pixel data from the immobile objects and utilizing the three-dimensional computerized representation to provide navigational guidance within the operating environment.

In some embodiments, analyzing the image data includes performing depth interpretation and semantic segmentation upon the image data.

In some embodiments, the computerized processor is within a vehicle.

In some embodiments, identifying the occlusion includes identifying a potentially mobile object in the operating environment and identifying the occlusion in the virtual camera view caused by the potentially mobile object.

In some embodiments, the method further includes operating a plurality of active camera devices to collect the image data.

In some embodiments, utilizing the historical iterations of the image data and the three-dimensional computerized representation to synthesize the virtual camera view includes utilizing epipolar reprojection to synthesize the virtual camera view.

In some embodiments, the method further includes operating a sensor device selected from a light detection and ranging (LIDAR) device or a radar device and utilizing data from the sensor device to improve the three-dimensional computerized representation.

The above features and advantages and other features and advantages of the present disclosure are readily apparent from the following detailed description of the best modes for carrying out the disclosure when taken in connection with the accompanying drawings.

DETAILED DESCRIPTION

Figure 1:
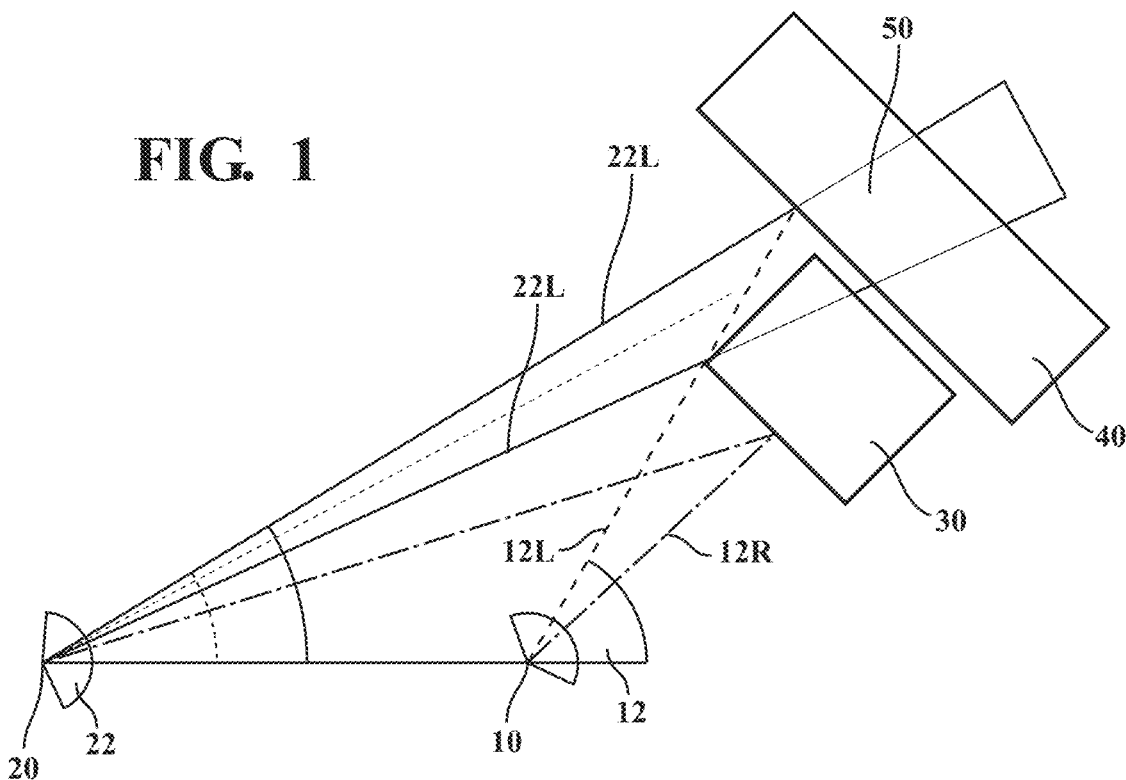
FIG. 1 schematically illustrates an exemplary first view of an operating environment generated by an active camera device and an exemplary synthesized virtual camera view of the operating environment, wherein the synthesized virtual camera view may be utilized to reconstruct occlusions in sensor data, in accordance with the present disclosure.

Autonomous navigation systems, semi-autonomous navigation systems, and driver-assist/driver-warning systems utilize sensor data to interpret an operating environment. Such an operating environment may include a driving surface upon a roadway and may include complex lane geometries, lane markings, unexpected features such as construction barriers and lane closures, and mobile or potentially mobile objects such as other vehicles and pedestrians. Analysis of sensor data enables a computerized controller to identify a clear path upon which to travel in the operating environment. However, sensor data may be imperfect or incomplete, for example, with an object in the operating environment obscuring details or creating occlusions in data related to the operating environment.

The human mind at a young age develops a concept described as object permanence. Once the mind develops object permanence, the person realizes that just because he or she cannot see an object anymore, it still exists. A similar tactic may be utilized in computerized analysis of an operating environment. Through image analysis techniques including semantic separation, pixels and groups of pixels in an image or a scene captured in an image may be determined to represent certain objects or surfaces in the environment. For example, a road surface has certain visual properties which may be distinguished from a patch of grass beside the road surface or from a telephone pole. Objects and surfaces may be analyzed and separated into immobile features and potentially mobile features in the view. Identifying immobile features may be useful in constructing a three-dimensional computerized representation of the operating environment, as the immobile features may be assumed to remain constant through an entire time period of travel through the operating environment. The three-dimensional computerized representation may be described as a static structural matrix. Other analyses may be operated to estimate a depth of objects and surfaces in the operating environment. For example, lane markings on a roadway may be substantially a same physical distance apart on the road surface, and a distance between pixels representing the lane markings may be utilized to estimate a depth in the scene such as a distance that a particular segment of lane marking is from the host vehicle analyzing the scene. Once immobile features are identified and a depth of the immobile features in the scene are estimated, these immobile features may be assumed or fixed in a computerized model or three-dimensional computerized representation of the operating environment. This computerized model or three-dimensional computerized representation of the operating environment may be used to define and update a clear path as a vehicle travels through the operating environment.

A system and method for occlusion reconstruction in surround views using temporal information is provided. The system and method are useful for repairing occlusions caused by view perspective change for natural surround vision (NSV) images generated by epipolar reprojection. The system and method utilize temporal information from past frames, including pixel data from surround cameras, inferred depth and segmentation data, and vehicle pose data (e.g., odometry, global position systems, inertial navigation, etc.) The disclosed system and method may be utilized within a vehicle. The disclosed system may be utilized by an autonomous robot, for example, operating in a manufacturing environment. The disclosed system may be utilized in a variety of applications where autonomous navigation around an operating environment is desirable.

The disclosed system and method utilize temporal information for occlusions correction. The system may include a computerized process or engine useful to handle occlusions for either a static or dynamic host vehicle. The disclosed method creates a virtual image (view perspective change) using information from surround cameras. In one embodiment, the system selects a virtual camera position illustrating a desired viewpoint and populates pixel by pixel what an image taken from that virtual camera position would look like, using historical camera and/or sensor data to estimate what each pixel would look like. To avoid surround vision artifacts (e.g., object elimination, distortions, ghosting, etc.), the disclosed method uses inferred depth to accommodate a three-dimensional structure of the scene. The virtual image may be synthesized at a plurality of alternative viewpoints, however, perspective change inevitably introduces areas not covered by the surround cameras, which may be described as occluded areas or an occlusion. Perspective change may include movement of the viewer and/or movement of an object in the operating environment of the viewer.

Using depth and segmentation inference, combined with epipolar reprojection (ER) between the virtual view location and the physical camera(s), at each time step, one may calculate relevant information for the virtual camera (pixels+depth+segmented objects+masks). Historic or temporal information may be used to fill-in the occlusions generated by dynamic objects in the scene or by motion of the host vehicle.

Single time-stamp (TS) images have occlusions; however, some occluded areas at time t=n were covered by surround cameras at time t=n−1, n−2, n−3, etc. For a moving vehicle, using odometry data, it is possible to estimate previous surround camera poses relatively to the required viewpoint and include history data into ER. For a static vehicle, static background pixels are occluded and exposed by moving objects in the scene. An analysis of image data may include surround scene depth/segmentation inference. Segmentation can be used to locate globally static objects (road, buildings, trees). In one embodiment, one may use pixels determined to be associated with static or immobile objects or features to reconstruct occlusions to thereby avoid motion artifacts.

According to one alternative embodiment, a system for occlusion reconstruction in surround views using temporal information is provided. The system includes a device including an active camera device generating image data describing a first view perspective of an operating environment and a computerized visual data controller. The computerized visual data controller includes programming to analyze the image data to generate a three-dimensional computerized representation of objects in the operating environment, and image pixel classification/image segmentation to generate a virtual camera view perspective from a desired viewpoint, and to identify an occlusion (or occlusions) in the virtual camera view. The computerized visual data controller further includes programming to utilize historical iterations of the image data, of the three-dimensional computerized representation of the operating environment, and of image pixel classification/image segmentation to analyze the virtual camera view perspective to estimate filled information for the occlusion. The computerized visual data controller further includes programming to reconstruct the occlusion in the three-dimensional computerized representation with the filled information. The computerized visual data controller further includes programming to utilize the three-dimensional computerized representation to command movement within the operating environment.

Referring now to the drawings, wherein like reference numbers refer to like features throughout the several views, FIG. 1 schematically illustrates an exemplary a first view 10 of an operating environment 5 generated by an active camera device and an exemplary synthesized virtual camera view 20 of the operating environment 5, wherein the synthesized virtual camera view 20 may be utilized to reconstruct occlusions 50 in sensor data. The first view 10 includes a first field of view 12 with a reflection line 12R that intersects the synthesized virtual camera view 20. The synthesized virtual camera view 20 includes a second field of view 22 that includes occlusion boundary lines 22L that intersect with a first field of view line 12L to define a portion of the occlusion 50. A first object 30 and a second object 40 are illustrated in the operating environment 5. The first object 30 may be defined as a mobile or potentially mobile object, and the second object 40 may be defined as an immobile object.

The synthesized virtual camera view 20 may be generated through a variety of methods. In one embodiment, the synthesized virtual camera view 20 may include data gathered at some previous time by the same sensor device gathering the sensor data presently defined as the first view 10. So, for instance, a forward facing sensor device embodied as a camera device may be installed to a front of a host vehicle in motion down a roadway. Current or a most recent image captured by the camera device may define or provide data regarding the first view 10. An image or a series of images captured by the same camera device two seconds previously may be utilized to generate the synthesized virtual camera view 20. In one instance, the first view 10 may be clear, with an open road in the scene of the image, and an entirety of the road surface may be estimated. In such an instance, the synthesized virtual camera view 20 may be irrelevant as no occlusions exist in the estimate road surface or the three-dimensional computerized representation of the operating environment of the host vehicle. In another instance, a second vehicle may pass to the left of the host vehicle. A left side of the roadway including the lane markings on the side of the roadway may have been visible two seconds prior, but, due to the second vehicle in a lane to the left of the host vehicle, the left side of the roadway and markings thereupon are no longer visible. By using details available in the synthesized virtual camera view 20, data regarding immobile features in the scene including the geometry of the left side of the roadway and markings upon the left side of roadway may be assumed to still exist despite the fact that they are not presently visible to the camera device generating the first view 10.

In FIG. 1, while the occlusion 50 including details about the second object 40 is hidden from view of the sensor device generating the first view 10 by the first object 30, an analysis of the synthesized virtual camera view 20 enables the computerized system to reconstruct the occlusion 50 and estimate details about the second object 40 within the occlusion 50.

Figure 2:
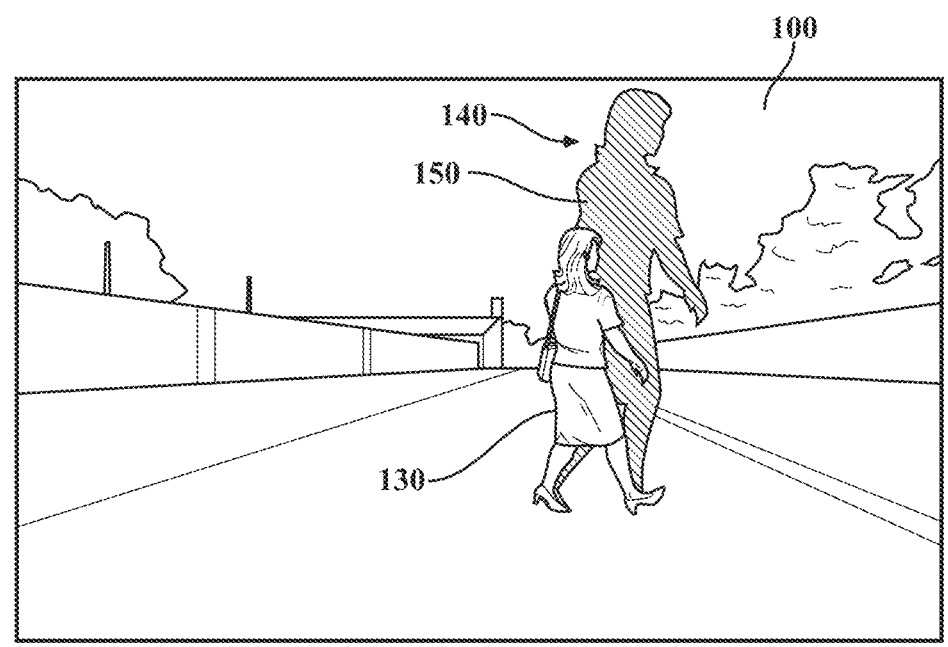
FIG. 2 schematically illustrates the sensor data generated by an active camera device viewed from the synthesized virtual camera view, illustrating occlusions in the sensor data, in accordance with the present disclosure.

FIG. 2 schematically illustrates sensor data generated by an active camera device of a scene 100 viewed from the synthesized virtual camera view, illustrating an occlusion 150 in the sensor data. The scene 100 illustrates sensor data available to the synthesized virtual camera view, which for example, may include data gathered by a camera device at some time prior to a current time. An object 130 including a pedestrian is illustrated in the scene 100. A background 140 of immobile objects or features in the scene 100 is illustrated. A first view of the scene 100 is generated from a point to left and below the illustrated synthesized virtual camera view of FIG. 2. The first view includes the occlusion 150, where data gathered within the first view generated to the left and below the illustrated synthesized virtual camera view does not include data or details regarding an area of the background 140 of immobile objects or features represented by the occlusion 150 because the object 130 blocks the first view from those details.

Figure 3:
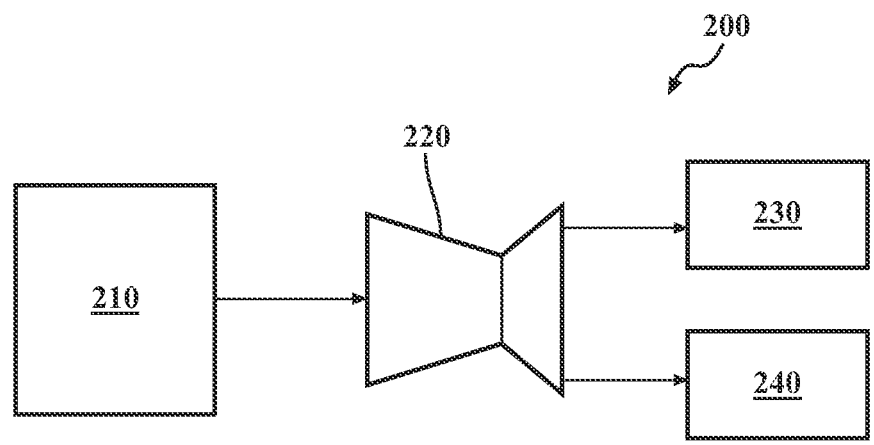
FIG. 3 schematically illustrates a flow of data useful to accomplish depth interpretation and semantic segmentation of sensor data including an input image, in accordance with the present disclosure.

FIG. 3 schematically illustrates a flow of data 200 useful to accomplish depth interpretation and semantic segmentation of sensor data including an input image. An input image 210 including a two-dimensional matrix of colorized pixels is provided as an input to a depth interpretation and semantic segmentation programming module 220. The depth interpretation and semantic segmentation programming module 220 represents programming that may be operated within a computerized device or computerized controller including a processor operable to execute programmed code. The depth interpretation and semantic segmentation programming module 220 provides a semantic segmentation output 230 dividing pixels of the input image 210 into groups based upon identified objects, features, or classifications that may be made, for example, through computerized image recognition techniques. In one embodiment, the depth interpretation and semantic segmentation programming module 220 may compare groups of pixels to a library of stored images and identify the groups of pixels as representing an object or feature based upon the comparison. The depth interpretation and semantic segmentation programming module 220 may further use identified objects and features from the input image 210 to estimate depth within the input image 210, for example, estimating a distance of each of the identified objects and features from the camera device that gathered the data. Estimated depth within the input image 210 may be provided as depth estimate output 240.

Figure 4:
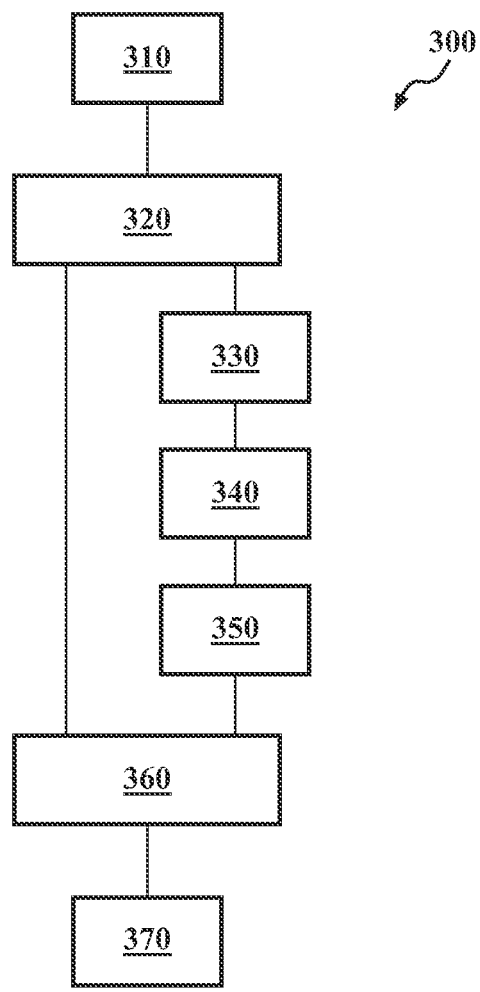
FIG. 4 is a flowchart illustrating an exemplary method for occlusion reconstruction in surround views using temporal information, in accordance with the present disclosure.

FIG. 4 is a flowchart illustrating a method 300 for occlusion reconstruction in surround views using temporal information. The method 300 starts at step 310. At step 320, the computerized system acquires one or more images captured by one or more camera devices representing a present or first view, where semantic segmentation and depth estimation is performed upon data in the one or more provided images, such that a host vehicle pose or an ego pose may be estimated. The data collected and generated at step 320 may be described to occur at time t=n. The data collected and generated at step 320 may be utilized in two ways. The data collected and generated at step 320 may be provided to step 360, wherein analysis of current data at time t=n may be operated. Further, the data collected and generated at step 320 may be stored in step 330 in computerized or digital memory. In step 340, a three-dimensional computerized representation of an operating environment may be generated or updated based upon the data collected and generated at step 320. At step 350, data from previous iterations (t<n), i.e. historical or temporal data, may be referenced and utilized to estimate historical camera poses useful to generate a synthesized virtual camera view. At step 360, analysis of current data at time t=n may be operated, occlusions in the present data may be identified, and data from the synthesized virtual camera view generated at step 350 may be utilized to reconstruct or fill the occlusion/occluded data. The method 300 ends at step 370. The method 300 may be iteratively operated, for example, with the data from the current time being relabeled at step 360 as t=n−1, and a new set of data being collected as the method 300 returns to step 310. The method 300 is provided as an example, the method 300 may include additional or alternative steps, and the disclosure is not intended to be limited to the examples provided herein.

The three-dimensional computerized representation generated and updated at step 340 may be provided as an output or utilized as a computerized model for navigating a vehicle.

Figure 5:
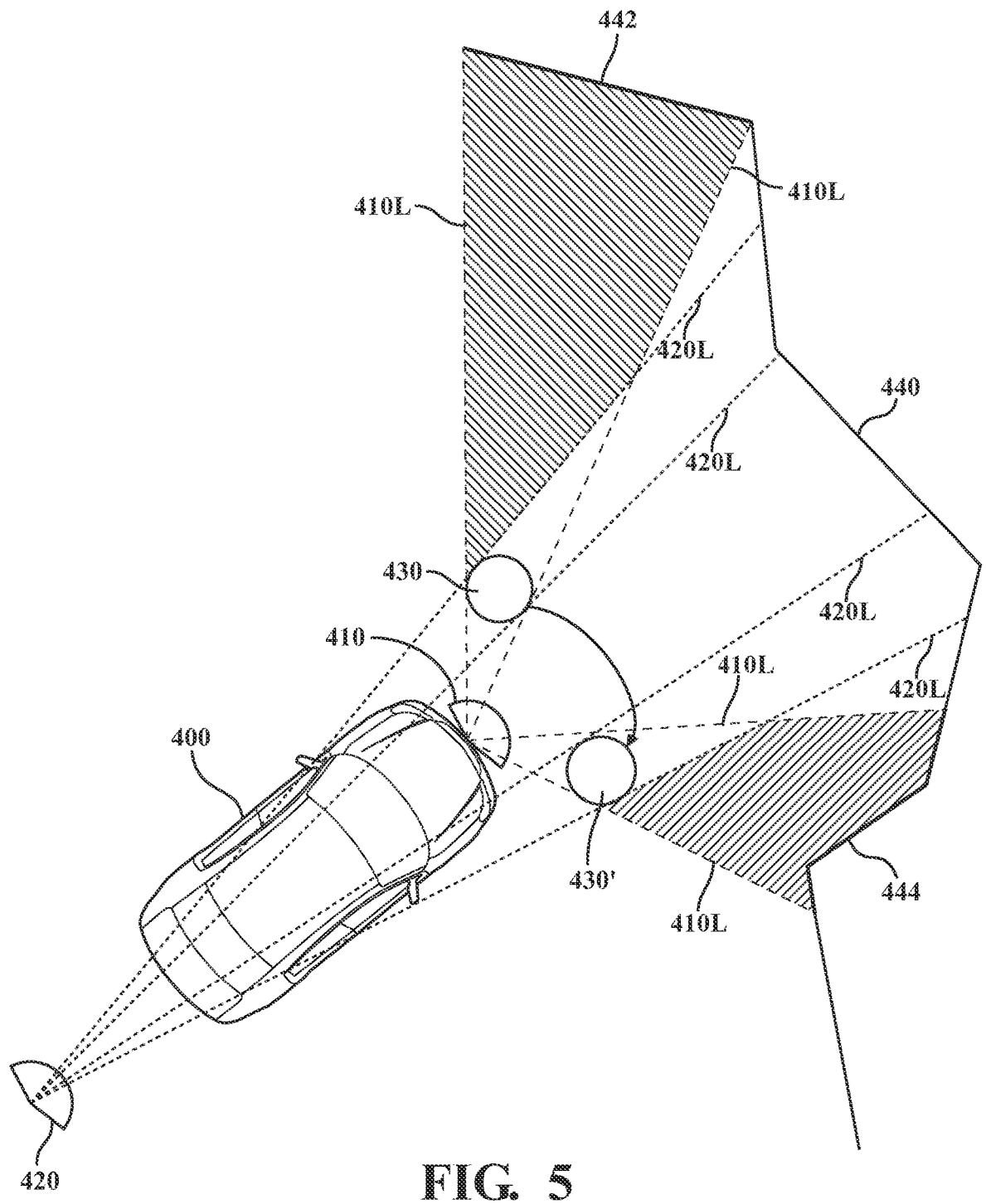
FIG. 5 schematically illustrates an exemplary vehicle operating the disclosed system to interpret an operating environment, including a synthesized virtual camera view being used to reconstruct occlusions in sensor data gathered by the vehicle, in accordance with the present disclosure.

FIG. 5 schematically illustrates an exemplary host vehicle 400 operating the disclosed methods to interpret an operating environment 440, including a synthesized virtual camera view 420 being used to reconstruct occlusions 442, 444 in sensor data gathered by the host vehicle 400. The host vehicle 400 is illustrated including a sensor device including a camera device disposed upon a front of the vehicle. The host vehicle 400 generates a first view 410 at a current time based upon data from the camera device, resulting in the first view 410 including a field of view defined by some angle to a left and right of a longitudinal axis of the host vehicle 400. The operating environment 440 of the host vehicle 400 is illustrated, simplified as a segmented shape with facets at different angles representing immobile features in the operating environment 440. An object at time t=n−1 430 is illustrated, and the object at time t=n 430' is illustrated. The object at time t=n−1 430 is illustrated between the host vehicle 400 and the operating environment 440, which creates an occlusion 442 at time t=n−1. The first view 410 includes object boundary lines 410L and a synthesized virtual camera view 420 is illustrated with object boundary lines 420L intersecting the objects 430, 430', which may include camera data gathered by the host vehicle 400 at some previous time. At time t=n−1, the camera device of the host vehicle 400 cannot gather data regarding the portion of the operating environment 440 represented by the occlusion 442. However, data provided by the synthesized virtual camera view 420 may be used to reconstruct or fill the occlusion 442. The host vehicle, at time t=n−1 may navigate utilizing data regarding the operating environment 440 including the reconstructed occlusion 442 provided by the synthesized virtual camera view 420.

During the time span between t=n−1 and t=n, the host vehicle 400 is stationary, resulting in a first view 410 at time t=n identical or substantially identical to the first view 410 at time t=n−1, as the camera device is in a same location and pose at both times. The object at time t=n−1 430 moves during the time span, and is illustrated in its new location as the object at time t=n 430'. The object at time t=n 430' obscures a portion of the operating environment 440 as occlusion 444. The portion of operating environment 440 represented by the occlusion 444 is visible or may be estimated by information available through the synthesized virtual camera view 420. Additionally or alternatively, a new synthesized virtual camera view may be defined to be coincident with the first view 410 based upon data gathered at time t=n−1, as the portion of the operating environment 440 that is represented by the occlusion 444 was visible to the host vehicle 400 at time t=n−1. Thus, the occlusion 444 at time t=n may be reconstructed through analysis of temporal data.

Figure 6:
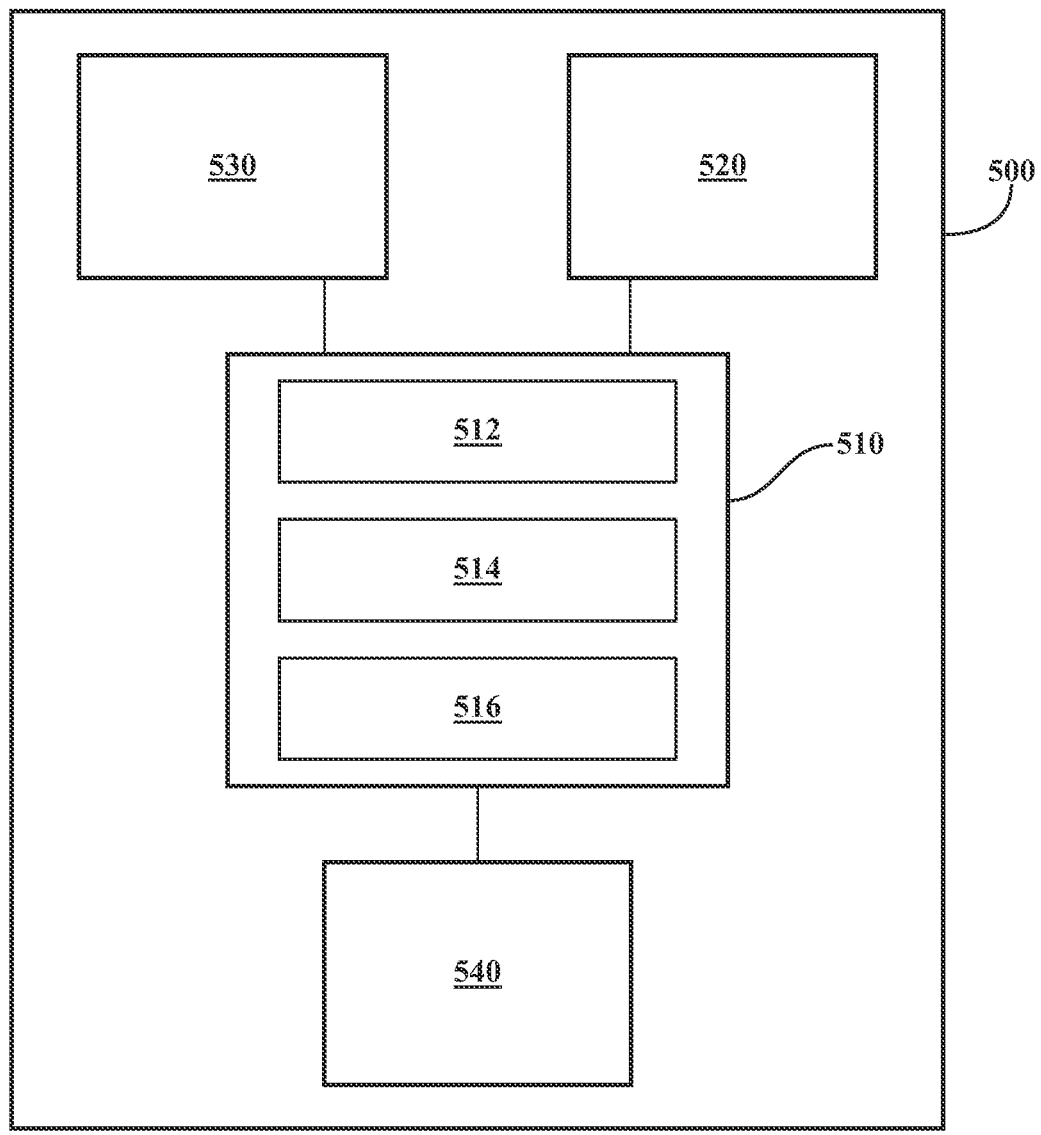
FIG. 6 schematically illustrates an exemplary computerized visual data controller configured for operating the disclosed method, in accordance with the present disclosure.

FIG. 6 schematically illustrates an exemplary computerized visual data controller 500 configured for operating the disclosed method. FIG. 8 schematically illustrates the computerized visual data controller 500 of FIG. 7. Computerized visual data controller 500 includes processing device 510, communications device 520, data input output device 530, and memory storage device 540. It is noted that computerized visual data controller 500 may include other components and some of the components are not present in some embodiments.

The processing device 510 may include memory, e.g., read only memory (ROM) and random-access memory (RAM), storing processor-executable instructions and one or more processors that execute the processor-executable instructions. In embodiments where the processing device 510 includes two or more processors, the processors may operate in a parallel or distributed manner. Processing device 510 may execute the operating system of the computerized visual data controller 500. Processing device 510 may include one or more modules executing programmed code or computerized processes or methods including executable steps. Illustrated modules may include a single physical device or functionality spanning multiple physical devices. In the illustrative embodiment, the processing device 510 also includes an image processing module 512, a three-dimensional computerized representation module 514, and an occlusion reconstruction module 516, which are described in greater detail below.

The data input output device 530 is a device that is operable to take data gathered from sensors and devices throughout the vehicle and process the data into formats readily usable by processing device 510. Data input output device 530 is further operable to process output from processing device 510 and enable use of that output by other devices or control modules throughout the vehicle.

The communications device 520 may include a communications/data connection with a bus device configured to transfer data to different components of the system and may include one or more wireless transceivers for performing wireless communication.

The memory storage device 540 is a device that stores data generated or received by the computerized visual data controller 500. The memory storage device 540 may include, and is not limited to, a hard disc drive, an optical disc drive, and/or a flash memory drive.

The image processing module 512 includes programming to process data collected by a sensor device of the host vehicle. The image processing module 512 may include the programming of the depth interpretation and semantic segmentation programming module 220 of FIG. 3 or may communicate with a separate depth interpretation and semantic segmentation programming module 220 to receive outputs therefrom. The image processing module 512 includes techniques and methods useful to define objects and features in an operating environment of the host vehicle. The image processing module 512 includes techniques and methods to classify objects and features as either being immobile features or potentially mobile features.

The three-dimensional computerized representation module 514 may receive analyzed images from the image processing module 512 and may store the information. The three-dimensional computerized representation module 514 may include programming to generate a synthesized virtual camera view based upon historical data. Three-dimensional computerized representation module 514 may utilize iterations of data to generate a three-dimensional computerized representation of an operating environment of the host vehicle. The three-dimensional computerized representation module 514 may determine a clear path within the generated representation. The three-dimensional computerized representation module 514 may provide data from the three-dimensional computerized representation and of the operating environment and/or the determined clear path to other vehicle systems such as an autonomous navigation system.

The occlusion reconstruction module 516 may include programming to identify occlusions in the three-dimensional computerized representation. The occlusion reconstruction module 516 may include programming to reconstruct the identified occlusions with historical or temporal data. The reconstruction data may be provided to the three-dimensional computerized representation module 514 to improve or update the three-dimensional computerized representation generated and updated by the three-dimensional computerized representation module 514.

Computerized visual data controller 500 is provided as an exemplary computerized device capable of executing programmed code to accomplish the methods and processes described herein. A number of different embodiments of computerized visual data controller 500, devices attached thereto, and modules operable therein are envisioned, and the disclosure is not intended to be limited to examples provided herein.

Figure 7:
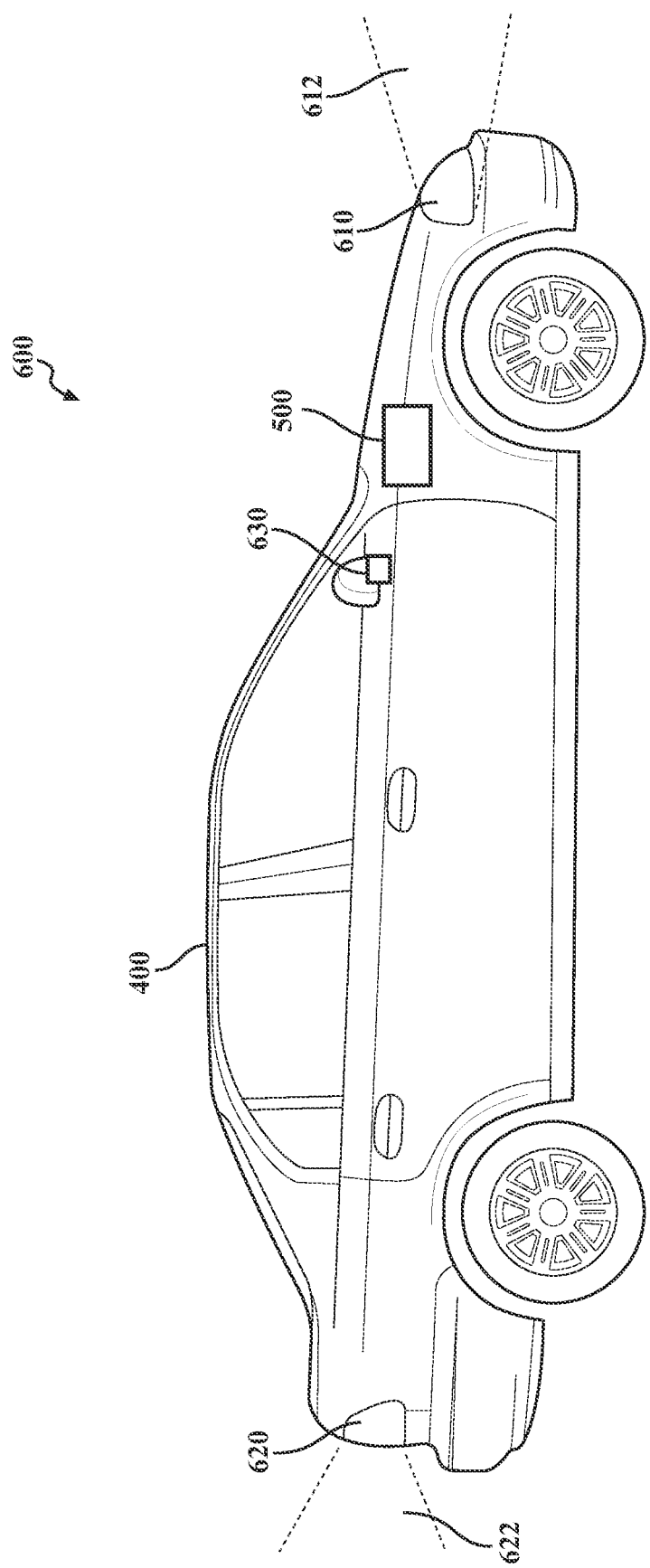
FIG. 7 schematically illustrates an exemplary device including a vehicle including the computerized visual data controller of FIG. 6 and a plurality of sensors gathering data regarding an operating environment of the vehicle, in accordance with the present disclosure.
Figure 8:
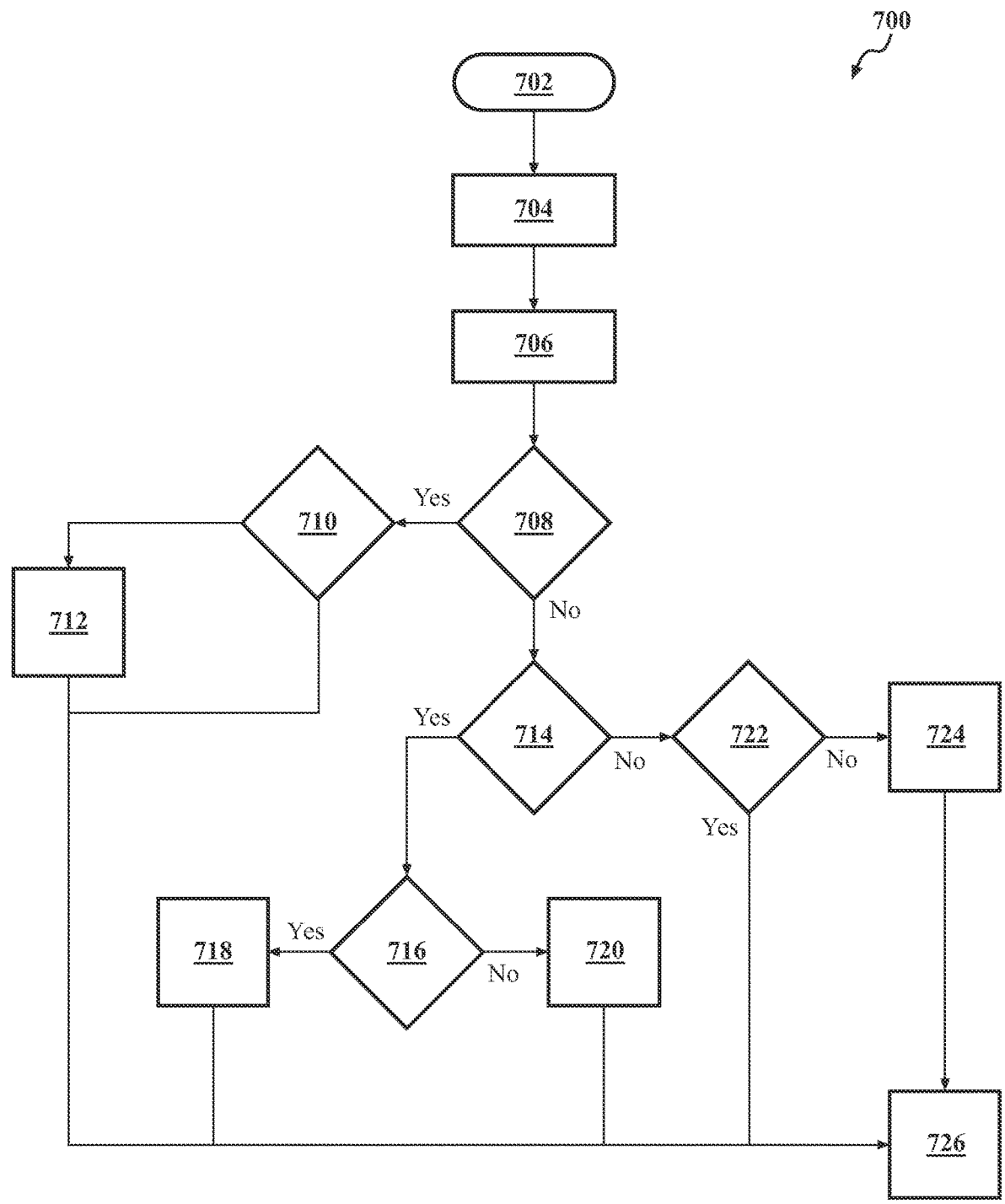
FIG. 8 is a flowchart illustrating a flow of sensor data and corresponding operations and determinations useful to reconstruct occlusions identified in the sensor data, in accordance with the present disclosure.

FIG. 7 schematically illustrates an exemplary device including the host vehicle 400 of FIG. 5 including a system 600 including the computerized visual data controller 500 of FIG. 6 and a plurality of sensors gathering data regarding an operating environment of the host vehicle 400. The host vehicle 400 is illustrated including a sensor device 610 including a field of view 612, a rearward-facing camera device 620 including a field of view 622, and a side-mirror camera device 630. The sensor device 610 may include a forward-facing camera device. In another embodiment, the sensor device 610 may additionally or alternatively include a LIDAR sensor device and/or a radar sensor device. Two side-mirror camera devices 630 may be provided, one on a driver-side and one on a passenger-side of the host vehicle 400. A number of different sensor configurations and fields of view are envisioned, and the disclosure is not intended to be limited to the examples provided. The computerized visual data controller 500 is in communication with the camera devices 610, 620, and 630 and other vehicle systems.

FIG. 8 is a flowchart illustrating a flow of sensor data and corresponding operations and determinations useful to reconstruct occlusions identified in the sensor data. The method 700 starts at step 702. At step 704, a new input image is analyzed, inference determinations are made regarding depth and segmentation, and occlusions in the input image are detected. At step 706, each pixel (red-green-blue, segmentation, occluded or not) is reprojected to a virtual view. Steps 708 through 726 illustrate a pixel-by-pixel process to generate and update a virtual view and generate and update a static structure matrix. The static structure matrix is one embodiment of a three-dimensional computerized representation of an operating environment. At step 708, a determination is made whether the current pixel being examined is occluded. If the pixel is occluded, the method 700 advances to step 710. If the pixel is not occluded, the method 700 advances to step 714.

At step 710, a determination is made whether the pixel being examined is found in a static structure matrix of the virtual view. If the pixel is found in the static structure matrix, the method 700 advances to step 712. At step 712, the pixels values are updated, and the method advances to step 726. If the pixel is not found in the static structure matrix, the method 700 advances to the step 726.

At step 714, a determination is made whether pixel being examined is segmented as a static or immobile feature. If the pixel being examined is not segmented as an immobile feature, the method 700 advances to step 722. If the pixel being examined is segmented as an immobile feature, the method 700 advances to step 716. At step 716, a depth of the pixel being examined is compared to a depth of a pixel stored in the static structure matrix to see if the pixel being examined has a smaller depth value than the stored pixel. If the pixel being examined has a smaller depth value than the stored pixel, then the method 700 advances to step 718 where the pixel being examined is used to update the static structure matrix. If the pixel being examined does not have a smaller depth value than the stored pixel, then the method 700 advances to step 720 where the virtual view may be updated with the stored value from the static structure matrix.

At step 722, the input image is examined to determine whether it is the first image to be examined. If the input image is the first image to be examined, the method 700 advances to step 726. If the input image is not the first image to be examined, the method 700 advances to step 724. At step 724, the virtual view is updated with the pixel being examined.

At step 726, the process of steps 708 to 726 are iteratively repeated for every pixel to be examined. When no more pixels remain to be examined, the virtual view data may be provided as an output, for example, to be used to reconstruct occlusions as disclosed herein. The method 700 is exemplary and may have additional and/or alternative method steps, and the disclosure is not intended to be limited to the examples provided herein.

Information determined regarding the operating environment may be utilized in a number of ways. For example, with a vehicle driven by user, the information regarding the operating environment may be used to provide navigational guidance in the form of lane keeping outputs, collision avoidance outputs, and driving line graphical projection. In another example, in an autonomous or a semi-autonomous vehicle, the information may be utilized to provide navigational guidance in the form of navigating the vehicle through the environment.

While the best modes for carrying out the disclosure have been described in detail, those familiar with the art to which this disclosure relates will recognize various alternative designs and embodiments for practicing the disclosure within the scope of the appended claims.

What is claimed is:

1. A system for occlusion reconstruction in surround views using temporal information, the system comprising:
    an active camera device generating image data describing a first view of an operating environment; and
    a computerized visual data controller, including programming to:
        analyze the image data to generate a three-dimensional computerized representation of the operating environment;
        utilize the image data and the three-dimensional computerized representation of the operating environment to synthesize a virtual camera view of the operating environment from a desired viewpoint;
        identify an occlusion in the virtual camera view;
        utilize historical iterations of the image data and identify immobile objects within the operating environment;
        utilize the historical iterations of the image data to estimate filled information for the occlusion;
        reconstruct the occlusion in the three-dimensional computerized representation with the filled information using pixel data from the immobile objects; and
        utilize the three-dimensional computerized representation to provide navigational guidance within the operating environment.

2. The system of claim 1, wherein the programming to analyze the image data includes programming to perform depth interpretation and semantic segmentation upon the image data.

3. The system of claim 1, wherein the programming to identify the occlusion includes programming to:
    identify a potentially mobile object in the operating environment that is movable relative to the active camera device and the immobile objects within the operating environment; and
    identify the occlusion in the virtual camera view caused by the potentially mobile object, wherein the occlusion in the virtual camera view lacks sensor data from the first view of the active camera device due to the potentially mobile object blocking the first view and the virtual camera view is spaced from the first view with the virtual camera view being located behind a vehicle without including the vehicle in the virtual camera view and the active camera device is located on a front of the vehicle on an opposite side of the vehicle from the virtual camera view.

4. The system of claim 1, further comprising:
    a plurality of active camera devices generating the image data with the plurality of active camera devices are each located on a vehicle;
    a sensor device selected from a light detection and ranging (LIDAR) device or a radar device; and
    wherein the computerized visual data controller further includes programming to utilize data from the sensor device to improve the three-dimensional computerized representation and the programming to analyze the image data includes programming to perform depth interpretation and semantic segmentation upon the image data.

5. The system of claim 1, wherein the programming to utilize the image data and the three-dimensional computerized representation to synthesize the virtual camera view includes programming to utilize epipolar reprojection to synthesize the virtual camera view.

6. The system of claim 1, further comprising a sensor device selected from a light detection and ranging (LIDAR) device or a radar device; and
    wherein the computerized visual data controller further includes programming to utilize data from the sensor device to improve the three-dimensional computerized representation.

7. A system for occlusion reconstruction in surround views using temporal information, the system comprising:
    a device including:
        an active camera device generating image data describing a first view of an operating environment; and
        a computerized visual data controller, including programming to:
            analyze the image data to generate a three-dimensional computerized representation of the operating environment;
            utilize the image data and the three-dimensional computerized representation of the operating environment to synthesize a virtual camera view of the operating environment from a desired viewpoint; and
            identify an occlusion in the virtual camera view;
            utilize historical iterations of the image data and identify immobile objects within the operating environment;
            utilize the historical iterations of the image data to estimate filled information for the occlusion;
            reconstruct the occlusion in the three-dimensional computerized representation with the filled information using pixel data from the immobile objects; and
            utilize the three-dimensional computerized representation to provide navigational guidance within the operating environment.

8. The system of claim 7, wherein the device includes a vehicle and the first view of the operating environment is from a front of the vehicle and the virtual camera view is from a rear of the vehicle.

9. The system of claim 7, wherein the programming to analyze the image data includes programming to perform depth interpretation and semantic segmentation upon the image data.

10. The system of claim 7, wherein the programming to identify the occlusion includes programming to:
identify a potentially mobile object in the operating environment that is moveable relative to the active camera device and the immobile objects within the operating environment; and
identify the occlusion in the virtual camera view caused by the potentially mobile object, wherein the occlusion in the virtual camera view lacks sensor data from the first view of the active camera device due to the potentially mobile object blocking the occlusion from the first view.

11. The system of claim 7, further comprising a plurality of active camera devices generating the image data with the plurality of active camera devices are each located on a vehicle;
a sensor device selected from a light detection and ranging (LIDAR) device or a radar device; and
wherein the computerized visual data controller further includes programming to utilize data from the sensor device to improve the three-dimensional computerized representation and the programming to analyze the image data includes programming to perform depth interpretation and semantic segmentation upon the image data.

12. The system of claim 7, wherein the programming to utilize the image data and the three-dimensional computerized representation to synthesize the virtual camera view includes programming to utilize epipolar reprojection to synthesize the virtual camera view.

13. The system of claim 7, further comprising a sensor device selected from a light detection and ranging (LIDAR) device or a radar device; and
wherein the computerized visual data controller further includes programming to utilize data from the sensor device to improve the three-dimensional computerized representation.

14. A method for occlusion reconstruction in surround views using temporal information, the method comprising:
operating an active camera device to collect image data describing a first view of an operating environment; and
within a computerized processor:
receiving the image data from the active camera device;
analyzing the image data to generate a three-dimensional computerized representation of the operating environment;
utilizing the image data and the three-dimensional computerized representation of the operating environment to synthesize a virtual camera view of the operating environment from a desired viewpoint;
identifying an occlusion in the virtual camera view;
utilizing historical iterations of the image data and identify immobile objects within the operating environment;
utilizing the historical iterations of the image data to estimate filled information for the occlusion;
reconstructing the occlusion in the three-dimensional computerized representation with the filled information using pixel data from the immobile objects; and
utilizing the three-dimensional computerized representation to provide navigational guidance within the operating environment.

15. The method of claim 14, wherein analyzing the image data includes performing depth interpretation and semantic segmentation upon the image data.

16. The method of claim 14, wherein the computerized processor is within a vehicle and the first view of the operating environment is obtained from a front of the vehicle and the virtual camera view is from a rear of the vehicle.

17. The method of claim 14, wherein identifying the occlusion includes:
identifying a potentially mobile object in the operating environment that is moveable relative to the active camera device and the immobile objects within the operating environment; and
identifying the occlusion in the virtual camera view caused by the potentially mobile object, wherein the occlusion in the virtual camera view lacks sensor data from the first view of the active camera device due to the potentially mobile object blocking the occlusion from the first view.

18. The method of claim 14, further comprising:
operating a plurality of active camera devices to collect the image data with the plurality of active camera devices are each located on a vehicle; and
utilizing data from a sensor device to improve the three-dimensional computerized representation and analyzing the image data includes performing depth interpretation and semantic segmentation upon the image data, wherein the sensor device selected from a light detection and ranging (LIDAR) device or a radar device.

19. The method of claim 14, wherein utilizing the historical iterations of the image data and the three-dimensional computerized representation to synthesize the virtual camera view includes utilizing epipolar reprojection to synthesize the virtual camera view.

20. The method of claim 14, further comprising:
operating a sensor device selected from a light detection and ranging (LIDAR) device or a radar device; and
utilizing data from the sensor device to improve the three-dimensional computerized representation.

* * * * *